Sept. 28, 1954     W. G. MUELLER     2,690,206

EXTRUSION COATING MACHINE

Filed March 23, 1953

INVENTOR.
WILLIAM G. MUELLER
BY
ATTORNEYS

Patented Sept. 28, 1954

2,690,206

UNITED STATES PATENT OFFICE 2,690,206

EXTRUSION COATING MACHINE

William George Mueller, Neenah, Wis., assignor to Marathon Corporation, Rothschild, Wis., a corporation of Wisconsin Application March 23, 1953, Serial No. 344,059

5 Claims. (Cl. 154—1)

1

This invention relates to coating machines, and more particularly to such machines in which a continuous flexible sheet of web-like material is coated in a continuous operation with a layer of thermoplastic material which through the action of the machine is firmly bonded to the web throughout the area of overlap.

The flexible web or base sheet may be of any of a number of various materials, such as paper, metal foil, cloth, or the like, and the coating may be of a substance such as, for example, polyethylene. Such coating materials are thermoplastic, so that they may be heated and then extruded in a plastic condition, and after being overlapped with the base sheet may be cooled to a non-liquid condition in firm adherence to the base sheet.

To obtain a securely-bonded finished coated sheet, proper control of a number of factors must be achieved. Among these factors are correct extrusion temperature of the coating material, distance from the point of extrusion to the point of overlap of the coating with the base sheet, application of pressure to bond the coating to the base sheet, and proper cooling temperature and time to fix the adhesion of the coating to the base sheet.

The proper temperature of extrusion is dependent upon the coating material. In most instances, the distance between the point of extrusion and the point of applying the extruded material to the base sheet should be the shortest possible, in order to avoid excessive cooling of the coating material before it is applied to the sheet. The pressure to be applied to bond the coating to the base sheet and the time and temperature of cooling are both principally dependent upon the nature of the coating material and the base sheet.

My invention provides improved means for controlling the quality of the finished coated sheet, and relates particularly to means for achieving substantially complete control over the distance between the point of extrusion of the coating material and the point where the material is applied to the base sheet. The objects and numerous advantages of my invention will be readily apparent from the following description and the accompanying drawings, in which.

Figure 1:
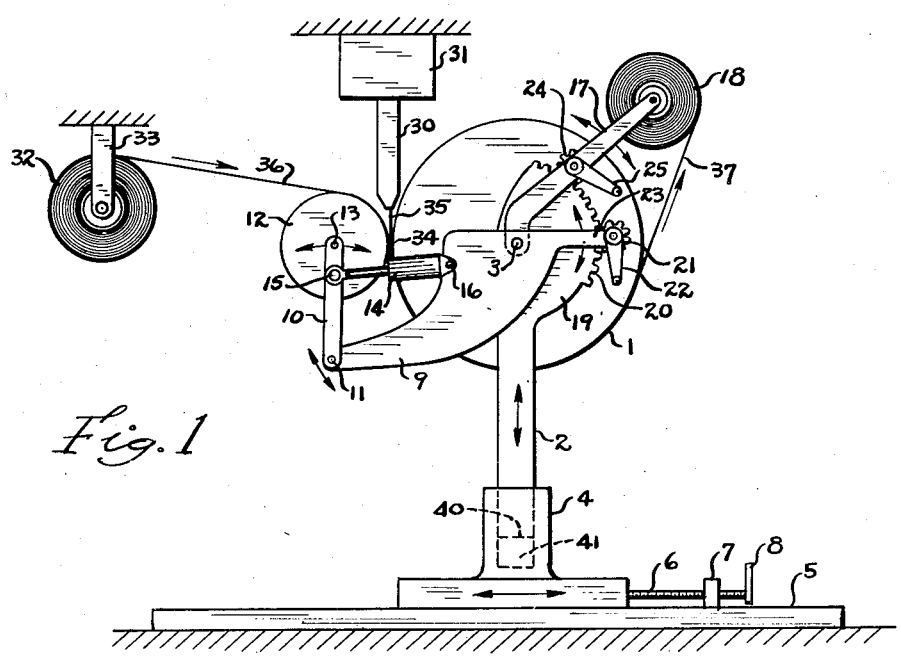
Figure 1 is a side elevation of my extrusion coating machine.

Referring first to Figure 1, it is seen that my invention includes a temperature roll or roller 1 mounted upon a stanchion 2 for rotation about point 3, which is also the axis of roll 1. Stanchion 2 is mounted in base member 4 for vertical movement with respect thereto, and base 4 in turn is mounted on fixed rails 5 for horizontal slidable movement with respect thereto.

The movement of stanchion 2 with respect to base member 4 may be accomplished by any suitable means, such as a hydraulic cylinder-piston assembly in which the lower end 40 of stanchion 2 could be formed as a piston and base 4 as a cylinder 41, with hydraulic fluid supply by and control means of any suitable conventional type. The translatory or planar movement of base 4 with respect to fixed rails 5 may be accomplished by any suitable means such as screw 6 threaded into base 4 and rotatably but non-slidably mounted within block 7 fixed to rails 5, screw 6 being turned by handle 8.

Stanchion 2 also carries a support member or bell crank 9 mounted for rotation about point 3 with respect to stanchion 2. A lever 10 is at one end pivotally mounted on an end of support 9 for pivotal movement about point 11 with respect to support 9. At its upper end lever 10 rotatably carries pressure roll or roller 12, mounted for rotation about point 13, which is also the axis of pressure roll 12. The axes 3 and 13 of rolls 1 and 12 are parallel, and the rolls are counter-rotating, roll 1 rotating counter-clockwise and roll 12, clockwise as seen in Figure 1. A cylinder-piston assembly 14 is connected between lever 10 and support member 9, being pivotally connected to lever 10 at point 15 and pivotally connected to support member 9 at point 16. Assembly 14 is supplied with hydraulic fluid under pressure by means of any suitable conventional type.

A second lever 17, rotatably carrying at its outer end a take-up roll 18, is at its inner end rotatably mounted on stanchion 2 for pivotal movement about point 3. An upper extension 19 of stanchion 2 has gear teeth 20 formed thereabouts along an arc of the circumference of a circle which has its center at point 3. A spur gear 21 and actuating handle 22 therefore are rotatably mounted on an extension 23 of support member 9. Similarly, lever 17 carries intermediate its ends a rotatably mounted spur gear 24 and actuating handle 25 therefor. Spur gears 21 and 24 mesh with gear teeth 20 on stanchion extension 19 and may be actuated to cause rotation of support member 9 and lever 17, respectively, with respect to stanchion 2 about point 3. Rotation of member 9 would of course carry roll 12 along, the axis 13 of roll 12 in such event following an arcuate or circular path having its center at the axis 3 of roll 1.

Still referring to Figure 1, it will be seen that the surfaces of rolls 12 and 1 very nearly meet along a point on the line connecting their respective axes 13 and 3. This point of near meeting of rolls 12 and 1 is commonly called the "nip" of the rolls. Extruder 30, mounted on fixed coating material reservoir 31, is located substantially directly above this nip.

A base sheet supply roll 32 is rotatably mounted on fixed supports 33.

The base sheet material, such as paper, paperboard, or foil, is supplied in continuous web form from supply roll 32. This web of base sheet material passes first over pressure roll 12, then through the nip, under temperature roll 1, and is wound up on take-up roll 18. As the base sheet enters the nip 34 of the rolls, a continuous thin sheet 35 of hot thermoplastic coating or surfacing material is extruded from the extruder 30 into nip 34. The spacing between rolls 12 and 1 at nip 34 is predetermined, and is sufficient to permit passage through the nip of the base sheet 36 and the coating material 35 under sufficient continuous compressive pressure to obtain a firm adhesive bond between the base sheet and the coating. This pressure may be controlled by means of hydraulic cylinder-piston assembly 14 mounted between lever 10 and support member 9. The combined base sheet 36 and extruded sheet 35, together comprising coated sheet material 37, pass downwardly through the nip, under temperature roll 1 in contact therewith, then upward to be wound onto take-up roll 18.

It is obvious that Figure 1, being a side elevation view, shows only one of a pair of stanchions 2, and of other of the described elements, the other of the pairs of such elements lying behind those shown.

Temperature roll 1 is by any suitable conventional means controlled at the desired temperature to cool the extruded sheet below its liquid temperature range and finish bonding the thermoplastic sheet material to the base sheet.

The exact direction of extrusion of the coating material may sometimes not be perfectly controlled, so that at times a particular coating may be extruded vertically as seen in Figure 1, while at other times the direction of extrusion may be at a considerable angle to the vertical. It will be readily apparent from Figure 1 that if the extrusion occurs off-vertical in one direction the extruded sheet of coating material will contact the base sheet before the united sheets enter the nip, while if the direction of extrusion is the other way the extruded sheet of coating material will contact the temperature roll 1 prior to the time the coating material and the base sheet enter the nip. In either event, the coating material will have a substantial opportunity to cool prior to the time that it is pressed into contact with the base sheet at the nip of the rolls. This may have serious adverse effects, resulting in an insecurely bonded finished sheet. Consequently, it is highly desirable that the machine be adjustable to permit an alignment whereby the extruded coating material, regardless of its angle of extrusion, will have first contact with the base sheet and with the temperature roll simultaneously and at substantially the exact nip of the rolls. But this result must also be achieved, for optimum results, without thereby causing the distance between the point of extrusion and the nip to increase, for as noted before, this distance should be kept at a minimum in order to avoid excessive cooling of the coating material before it is applied to the base sheet.

Figure 2:
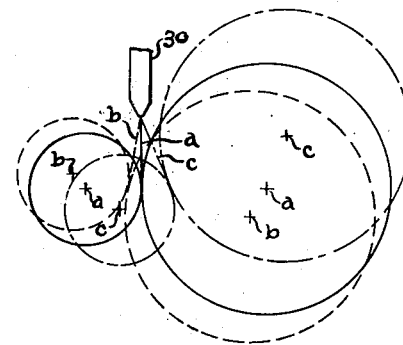
Figure 2 is a diagrammatic representation, in side elevation, showing various displacements of the extruded coating material and the movement of my machine to most advantageously account for this displacement.

Referring also to Figure 2, it is seen that my machine readily achieves the above desired result. Positions $a$ show in solid lines the rollers adapted to extrusion of the sheet of coating material in a vertical or normal plane. This is also the position shown in Figure 1. Positions $b$ show in dotted lines extrusion of the coating material at an angle to the left of the normal plane, and the movement of my rolls to maintain the line connecting the axes of the rolls perpendicular to the line of extrusion, with the extruded sheet entering exactly at the nip. Positions $c$ in broken lines illustrate extrusion of the coating material to the right of the normal line and the movement of my rolls to again place the line connecting the axes of the rolls perpendicular to the line of extrusion, with the extruded sheet again entering exactly at the nip. It is evident that in each of these conditions the inclination of the plane tangent to the rolls at their nip has conformed to the inclination of the extruded sheet. As will also be seen from Figure 2, the distance from the point of extrusion to the point of the nip of the rolls has remained constant, so assuming that this distance was originally at the optimum, my machine permits maintaining this optimum distance regardless of the angle of extrusion of the coating material. This adaptability of my machine is due to the ability to displace rolls 1 and 12 together (i. e., jointly) both horizontally and vertically and to move roll 12 about roll 1, oblique to the horizontal displacement of roll 1, with the center of movement the axis of roll 1.

If it is desired to change this distance between the nip and the point of extrusion, and to maintain this changed distance regardless of the angle of extrusion, it will be readily apparent that the feature of vertical displacement of stanchion 2 with respect to base member 4, together with the other possible movements described, provides a ready means for accomplishing this result.

Thus, my invention provides means for maintaining any desired distance between the point of extrusion and the nip of the rolls, with the line connecting the axes of the rolls perpendicular to the line of extrusion, regardless of the angle of extrusion of the coating material, subject of course to certain reasonable limitations based upon the construction of my machine. Take-up roll 18 is adjustably positioned by the means described above to permit the coated sheet to be led off temperature roll 1 after the proper amount of cooling has occurred.

It is obvious from the foregoing explanation that in changing the inclination of the plane tangent to rolls or rollers 1 and 12 at their nip to conform to the inclination of the extruded material no adjustment affecting the bonding pressure between the rolls at their nip is required, since adjustment of inclination of this plane involves no change in setting of cylinder-piston assembly 14, pressure roll 12 during such adjustment merely being carried by support member 9 rotatably about the axis 3 of roll 1. Consequently, no adjustment in the bond-producing roll pressure is necessary as rapid adjustments are made to conform the rolls to the extrusion angle.

It will be obvious that certain mechanical modifications might be made in my machine as here illustrated and described, without departing in any way from the spirit of my invention. It is therefore to be understood that my invention is to be limited only as set forth in the following claims.

I claim:

1. A machine including parallel, counter-rotating rollers adapted to bond in the nip of the rollers a thin sheet of surfacing material to a surface of a continuous sheet of web-like material carried by one of said rollers through their nip, means for displacing said rollers jointly in a first direction, means for displacing said rollers jointly in a second direction oblique to said first direction, means for displacing one of said rollers in a circular path having its center of radius at the axis of the other roller, and means for displacing said one roller in an arcuate path, whereby for any given angle of extrusion of the surfacing material entering the nip the inclination of the plane tangent to the rollers at their nip may be conformed to such angle of extrusion and the nip may be spaced at will from the source of the surfacing material, and a continuous pressure may be exerted between the rollers at their nip.

2. A machine for coating a continuous web of sheet material with an extruded sheet of thermoplastic coating material, the machine comprising a pair of parallel, counter-rotating rolls adapted to bond in their nip the sheet of coating material to a surface of the web, first means for displacing said rolls together in a first direction, second means for displacing said rolls together in a direction oblique to said first direction, third means for displacing one of said rolls in a circular path having its center at the axis of the other roll, and fourth means for displacing said one roll in an arcuate path, whereby for any given angle of extrusion of the coating material entering the nip the inclination of the common plane intersecting the axes of said rolls may be maintained perpendicular to said angle of extrusion and the nip may be spaced at will from the source of the extruded coating material, and a constant pressure may be exerted between the rolls at their nip.

3. A machine according to claim 2, wherein said first means comprises screw means for displacing said rolls horizontally, said second means comprises hydraulic means for displacing said rolls vertically, said third means comprises gear means, and said fourth means comprises further hydraulic means.

4. A machine for coating a continuous web of sheet material with an extruded sheet of thermoplastic coating material, the machine comprising a controlled-temperature roll, a pair of stanchions supporting said roll at its ends for rotation thereon, a pair of supports each rotatably mounted on one of said stanchions for rotation about the axis of said roll, a pair of levers each pivotally mounted on one of said supports, a pressure roll rotatably supported by said levers with its axis parallel to the axis of the temperature roll, first means connected between said levers and supports for forcing said pressure roll toward said temperature roll, second means connected between said stanchions and supports for rotating said supports relative to the stanchions, third means for vertically moving said stanchions, and fourth means for horizontally moving said stanchions, whereby for any given angle of extrusion of the coating material entering the nip of the rolls the inclination of the plane tangent to said rolls at their nip may be conformed to such angle of extrusion and the nip may be spaced at will from the source of extruded coating material, and constant pressure may be maintained between said rolls at their nip during such conformation of the inclination of said plane and spacing of the nip from the source of coating material without adjustment of said first means.

5. A machine according to claim 4, wherein said first and third means comprise a hydraulic cylinder-piston assembly, said second means comprises gears fixed to said stanchions intermeshed with pinions rotatably mounted on said supports, and said fourth means comprises a screw assembly.

References Cited in the file of this patent

UNITED STATES PATENTS

| Number | Name | Date |
|---|---|---|
| 2,607,712 | Sturken | Aug. 19, 1952 |